United States Patent
Schemagin et al.

(10) Patent No.: US 9,198,221 B2
(45) Date of Patent: Nov. 24, 2015

(54) MOBILE CELLULAR NETWORKS

(71) Applicant: Oceus Networks Inc., Reston, VA (US)

(72) Inventors: Pamela Schemagin, Plano, TX (US); Vincent Graffagnino, Rockwall, TX (US); Jouko Rytilahti, Dallas, TX (US); Ian Gibbs, McKinney, TX (US); James McGovern, Richardson, TX (US); John Green, Garland, TX (US); Kyle Collins, Plano, TX (US)

(73) Assignee: Oceus Networks Inc., Reston, VA (US)

( * ) Notice: Subject to any disclaimer, the term of this patent is extended or adjusted under 35 U.S.C. 154(b) by 156 days.

(21) Appl. No.: 13/972,112

(22) Filed: Aug. 21, 2013

(65) Prior Publication Data

US 2014/0057636 A1 Feb. 27, 2014

Related U.S. Application Data

(60) Provisional application No. 61/693,142, filed on Aug. 24, 2012.

(51) Int. Cl.
*H04W 36/32* (2009.01)
*H04W 36/04* (2009.01)
(Continued)

(52) U.S. Cl.
CPC .......... *H04W 84/005* (2013.01); *H04W 36/32* (2013.01); *H04W 84/042* (2013.01); *H04W 84/20* (2013.01)

(58) Field of Classification Search
CPC . H04W 36/0061; H04W 36/30; H04W 36/32; H04W 36/0055; H04W 36/0022; H04W 48/18; H04W 64/003; H04W 84/005; H04W 12/06; H04W 52/244; H04W 64/00; H04W 68/00; H04W 80/04

USPC ......... 455/441, 436, 437, 438, 439, 440, 444, 455/442, 445, 422.1
See application file for complete search history.

(56) References Cited

U.S. PATENT DOCUMENTS 5,768,501 A    6/1998  Lewis
7,486,967 B2   2/2009  Pan et al.
(Continued)

FOREIGN PATENT DOCUMENTS

EP    1 401 229 A1    3/2004
EP    1 553 734 A1    7/2005
(Continued)

OTHER PUBLICATIONS

Vikram Kaul, et al.: "On the adpatation of commercial smartphones to tactical environments", Military Communications Conference, 2011, Nov. 7, 2011, pp. 2205-2210.
(Continued)

*Primary Examiner* — Sharad Rampuria
*Assistant Examiner* — Obidon Bassinan
(74) *Attorney, Agent, or Firm* — Knobbe, Martens, Olson & Bear, LLP

(57) ABSTRACT

Multiple mobile cellular network (MCN) communication systems can be networked together to form a network of MCN communication systems (NOM). Each MCN communication system within the NOM can operate as an independent cellular network to provide communications between user equipment within a covered area. When a UE in one MCN of the NOM moves into a different MCN of the NOM, the corresponding MCN communication systems can handover the UE. The UE can also be handed over between MCN communication systems when the MCN communication systems move.

20 Claims, 9 Drawing Sheets

(51) Int. Cl.
*H04W 16/32* (2009.01)
*G01S 11/10* (2006.01)
*H04W 84/00* (2009.01)
*H04W 84/04* (2009.01)
*H04W 84/20* (2009.01)

(56) References Cited

U.S. PATENT DOCUMENTS

| | | | |
|---|---|---|---|
| 7,535,861 B2 | 5/2009 | Buchholz et al. | |
| 7,539,158 B2 | 5/2009 | Pan | |
| 7,548,763 B2 | 6/2009 | Pan | |
| 7,573,713 B2 | 8/2009 | Hoffman et al. | |
| 7,653,414 B2 | 1/2010 | Pan | |
| 7,684,801 B2 * | 3/2010 | Suzuki et al. | 455/436 |
| 7,817,589 B2 | 10/2010 | Hoffman et al. | |
| 7,840,230 B2 | 11/2010 | Pan | |
| 7,855,988 B2 | 12/2010 | Pan | |
| 7,856,233 B2 | 12/2010 | Pan | |
| 7,979,066 B2 | 7/2011 | Pan | |
| 8,036,158 B2 | 10/2011 | Pan et al. | |
| 8,046,420 B2 | 10/2011 | Pan | |
| 8,089,920 B2 | 1/2012 | Pan | |
| 8,107,409 B2 | 1/2012 | Pan | |
| 8,140,077 B2 * | 3/2012 | Saifullah et al. | 455/438 |
| 8,224,322 B2 | 7/2012 | Pan | |
| 8,270,325 B2 | 9/2012 | Hoffman et al. | |
| 8,310,990 B2 | 11/2012 | Pan | |
| 8,326,286 B2 | 12/2012 | Pan | |
| 8,340,667 B2 | 12/2012 | Pan | |
| 8,359,029 B2 | 1/2013 | Pan | |
| 8,374,124 B2 | 2/2013 | Abusch-Magder et al. | |
| 8,626,210 B2 | 1/2014 | Hicks, III | |
| 8,654,749 B2 | 2/2014 | Buchholz et al. | |
| 8,676,197 B2 * | 3/2014 | Pan et al. | 455/435.1 |
| 8,688,111 B2 | 4/2014 | Pan | |
| 8,706,105 B2 | 4/2014 | Pan | |
| 8,744,435 B2 | 6/2014 | Pan | |
| 8,780,804 B2 | 7/2014 | Pan | |
| 8,811,992 B2 * | 8/2014 | Hoole | 455/436 |
| 8,824,969 B2 * | 9/2014 | Nakamori et al. | 455/63.1 |
| 2001/0013107 A1 | 8/2001 | Lewis | |
| 2006/0098661 A1 | 5/2006 | Pan | |
| 2006/0234747 A1 | 10/2006 | Pan et al. | |
| 2006/0234774 A1 | 10/2006 | Pan et al. | |
| 2007/0049267 A1 | 3/2007 | Kota et al. | |
| 2007/0202847 A1 | 8/2007 | Pan et al. | |
| 2007/0232267 A1 | 10/2007 | Pan et al. | |
| 2007/0264930 A1 | 11/2007 | Daoudal | |
| 2007/0287452 A1 | 12/2007 | Pan et al. | |
| 2008/0005380 A1 | 1/2008 | Kawasaki et al. | |
| 2008/0039144 A1 | 2/2008 | Pan et al. | |
| 2008/0108378 A1 * | 5/2008 | Gessner et al. | 455/513 |
| 2008/0146158 A1 | 6/2008 | Pan et al. | |
| 2008/0181188 A1 | 7/2008 | Aghvami et al. | |
| 2008/0268830 A1 | 10/2008 | Sharma et al. | |
| 2008/0285492 A1 | 11/2008 | Vesterinen | |
| 2009/0201878 A1 | 8/2009 | Kotecha et al. | |
| 2009/0205023 A1 | 8/2009 | Pan et al. | |
| 2009/0227235 A1 | 9/2009 | Pan et al. | |
| 2009/0271491 A1 | 10/2009 | Pan et al. | |
| 2009/0280853 A1 | 11/2009 | Brisebois et al. | |
| 2009/0325584 A1 | 12/2009 | Pan et al. | |
| 2009/0327819 A1 | 12/2009 | Pan et al. | |
| 2010/0008306 A1 | 1/2010 | Pan et al. | |
| 2010/0008369 A1 * | 1/2010 | Pan | 370/401 |
| 2010/0027448 A1 | 2/2010 | Puthiyandyil et al. | |
| 2010/0075668 A1 | 3/2010 | Pan et al. | |
| 2010/0105373 A1 | 4/2010 | Kanade | |
| 2010/0190470 A1 | 7/2010 | Raleigh | |
| 2010/0197268 A1 | 8/2010 | Raleigh | |
| 2010/0202455 A1 | 8/2010 | Sundaram et al. | |
| 2010/0260157 A1 | 10/2010 | Buchholz et al. | |
| 2011/0059740 A1 | 3/2011 | Pan et al. | |
| 2011/0060853 A1 | 3/2011 | Pan et al. | |
| 2011/0122824 A1 | 5/2011 | Muhanna et al. | |
| 2011/0176536 A1 | 7/2011 | De Franca Lima et al. | |
| 2011/0195743 A1 | 8/2011 | Jee et al. | |
| 2011/0202589 A1 | 8/2011 | Piernot et al. | |
| 2011/0223921 A1 | 9/2011 | Pan et al. | |
| 2011/0275364 A1 | 11/2011 | Austin et al. | |
| 2012/0002607 A1 | 1/2012 | Pan et al. | |
| 2012/0051321 A1 | 3/2012 | De et al. | |
| 2012/0094659 A1 | 4/2012 | Pan et al. | |
| 2012/0106454 A1 | 5/2012 | Pan et al. | |
| 2012/0147874 A1 | 6/2012 | Kotecha | |
| 2012/0224474 A1 | 9/2012 | Beser | |
| 2012/0224566 A1 | 9/2012 | O'Leary | |
| 2012/0252444 A1 | 10/2012 | Pan et al. | |
| 2012/0276866 A1 | 11/2012 | Sennett et al. | |
| 2013/0028097 A1 | 1/2013 | Barrett | |
| 2013/0029708 A1 | 1/2013 | Fox et al. | |
| 2013/0039279 A1 | 2/2013 | Pan et al. | |
| 2013/0065583 A1 | 3/2013 | Pan et al. | |
| 2013/0130677 A1 | 5/2013 | Pan et al. | |
| 2013/0148578 A1 | 6/2013 | Pan et al. | |
| 2014/0057626 A1 | 2/2014 | Uelk et al. | |
| 2014/0154967 A1 | 6/2014 | Pan et al. | |
| 2014/0173388 A1 | 6/2014 | Pan et al. | |

FOREIGN PATENT DOCUMENTS

| | | | | |
|---|---|---|---|---|
| EP | 2031920 A1 * | 3/2009 | | H04Q 7/38 |
| GB | 2452796 | 3/2009 | | |
| WO | WO 2007/044880 | 4/2007 | | |
| WO | WO 2009/100736 A1 | 8/2009 | | |
| WO | WO 2009/127965 A1 | 10/2009 | | |
| WO | WO 2014/031689 A1 | 2/2014 | | |

OTHER PUBLICATIONS

Philip Nystromer: "Quiclink: A Portable 3G WCDMA Cellular Service, Deployed in Minutes" Presentation, Jun. 11, 2007, pp. 1-27.
International Search Report and Written Opinion dated Feb. 11, 2014, International Application No. PCT/US2013/055864.
"Digital cellular telecommunications system (Phase 2+); Universal Mobile Telecommunications System (UMTS); LTE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.
Press Release: *Harris Corporation Introduces Tactical 3G Cellular Network-in-a-Box for Warfighters*, Published Apr. 19, 2011, http://harris.com/view_pressrelease.asp?pr_id=3230.
Press Release: *Tecore Unveils The Mobile Industry's First 3G-4G Network in a Box (NIB)*,Published Feb. 14, 2011, http://www.tecore.com/newsevents/release.cfm?newsID=164.
Tecore Networks, *The Mobile Industry's First All-In-One Network Solution Supporting WCDMA, HSPA+ and LTE*, date of publication unknown, http://www.tecore.com/solutions/TecoreNetworks-Datasheet-2G-3G-4G-NetworkInABox.pdf.
International Search Report and Written Opinion dated Nov. 8, 2013, International Application No. PCT/US2013/055721.

* cited by examiner

MOBILE CELLULAR NETWORKS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Cellular networks typically include multiple stationary base stations in different locations that communicate with a mobile telephone switching office (MTSO) that is remotely located from the different base stations. The MTSO determines how calls are routed between the base stations and enables the base stations to communicate with each other for handover purposes. If a base station cannot communicate with the MTSO, or the rest of the network, all communications at that base station are lost and user equipment (UE) in corresponding network areas cannot communicate with other UEs, even if the UEs trying to communicate with each other are in the same network area. In addition, the base stations are built to be stationary so that UEs within a particular area always have network access.

Many locations throughout the world lack a network infrastructure that would enable users to communicate via a typical telephone or cellular network. In such locations it can be difficult for users to communicate effectively. Users must often rely on technologies that are more expensive, have lower bandwidth, or have limited use distances, such as satellite phones, half-duplex radio transceivers, etc. Furthermore, these locations often lack the resources to create the network infrastructure necessary for a cellular network, such as cell towers, base stations, switching stations, etc. In some circumstances, such as war zones, etc., building the network infrastructure for such communications is not feasible due to the transient nature of military personnel and equipment. For example, for a communications command center in a battlefield area, mobility can be an important feature to allow the command center to adapt to the changing battlefield conditions. Thus, stationary network technologies can be ineffective.

SUMMARY

One device that can be used to improve communications in such environments is a mobile cellular network (MCN) communication system, also referred to as a network-in-a-box (NIB). The NIB can include all of the components of a typical cellular network, but residing in one device. Further, the NIB does not need to communicate with other nodes, other base stations, or an MTSO to provide complete cellular network functionality to UEs within a covered area. One example of a commercially available NIB, or MCN communication system, is the Xiphos™ available from Oceus Networks.

In addition, as the NIB moves, the network coverage moves with it. Thus, NIBs can create a cellular network within a limited area that allows user equipment within that area to communicate with each other.

DETAILED DESCRIPTION

To increase the range of a mobile cellular network (MCN), multiple MCN communication systems (or NIBs) can be networked together to create a network of MCN communication systems, also referred to herein as a NOM. The different MCN communication systems within the NOM can communicate with each other using a variety of communication technologies, including satellite communication, microwave or radio wave communication, OFDM, WiMAX, etc. In addition, the NOM can communicate with other NOMs, such as, for example, via MCN communication systems configured as master devices. Furthermore, should one of the MCN communication systems become disabled, such as a master device, the remaining MCN communication systems in the NOM can communicate to reorganize the NOM.

The MCN communication system can also perform handover operations when user equipment moves from one coverage area to another coverage area within the NOM. Furthermore, if a MCN communication system moves from one location to another, the NOM can allocate affected user equipment between the moving MCN communication system and other MCN communication systems in the area.

Figure 1A:
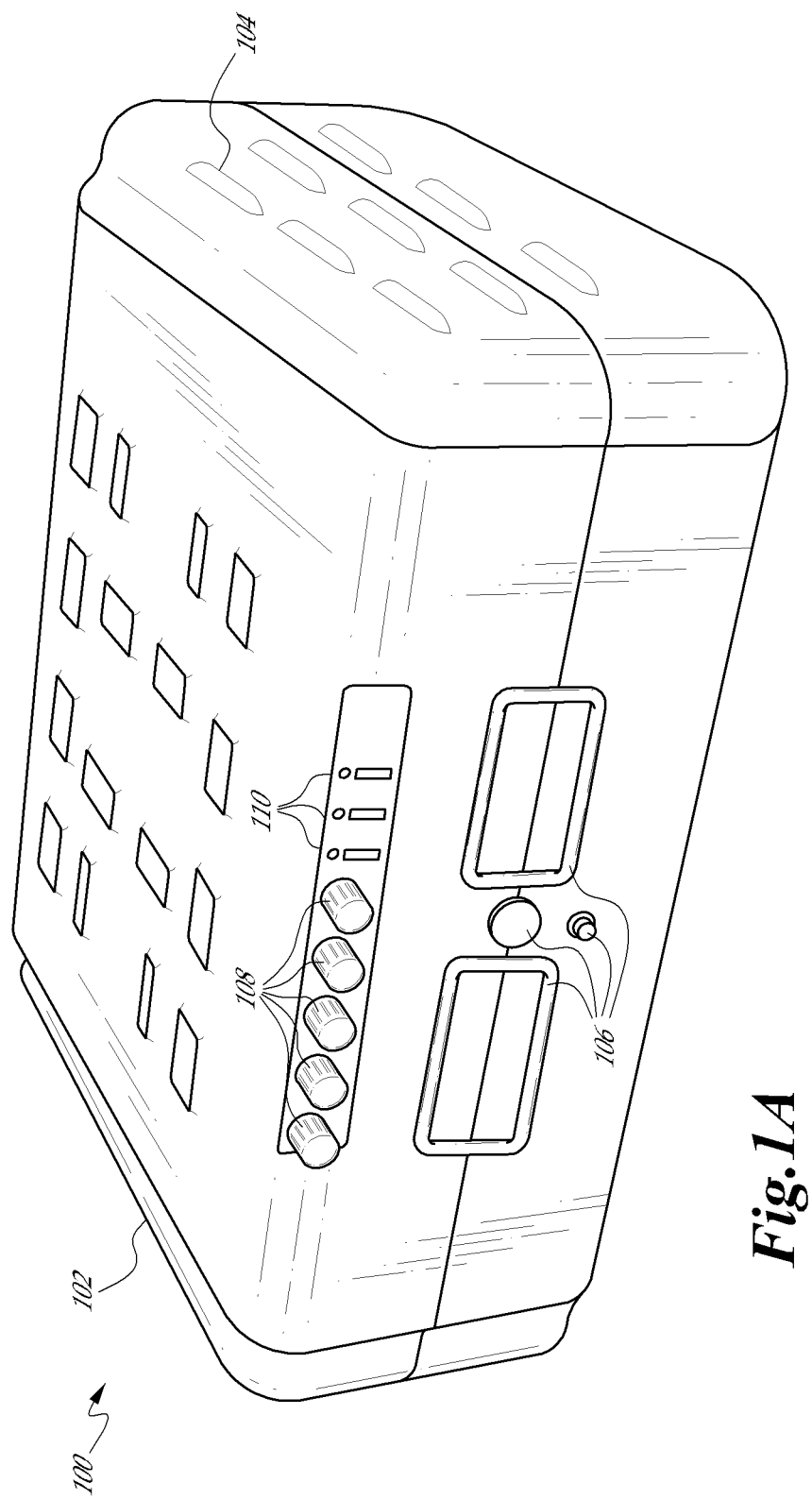
FIG. 1A is a diagram of an encasement for a mobile cellular network (MCN) communication system.

FIG. 1A is a diagram of an encasement 102 for a mobile cellular network (MCN) communication system 100. The components of the MCN communication system 100 will be described in greater detail with reference to FIG. 1B. The encasement 102 can be formed from a stiff polymer or other material and can be ruggedized to withstand harsh external environments, such as battlefield environments. The encasement 102 can include air vents 104 to improve cooling of the components of the MCN communication system 100.

The encasement 102 can also include locking mechanisms 106, ports 108 and status indicators 110. The locking mechanisms 106 can be used to ensure the components of the MCN communication system 100 remain protected within the encasement 102. The locking mechanisms can include latches, buttons, keys, etc., to lock the encasement 102.

The ports 108 can provide communication pathways from the MCN communication system 100 to exterior devices, such as an antenna, computer, tablet, personal computing device and the like. The ports 108 can also include power and grounding connections. The ports 108 can include an RF port, Ethernet ports, USB ports, power supply connectors, serial ports, etc.

The status indicators 110 can provide the status of the components of the MCN communication system 100. The status indicators can indicate whether the MCN communication system 100 has power, is active, and/or whether there is an alarm condition. Furthermore, the status indicators 110 can indicate the severity of an alarm condition of one or more of the components. In addition, each component can be associated with one or more status indicators 110. In this way a user can quickly assess the status of the MCN communication system 100. In some embodiments the status indicators change color based on the severity of an alarm condition.

Figure 1B:
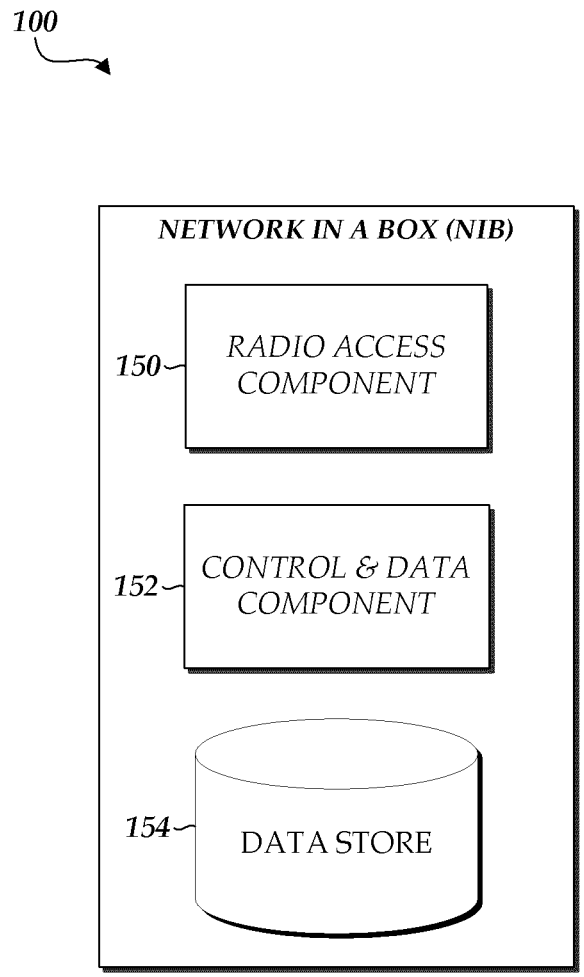
FIG. 1B is a block diagram of an embodiment of a MCN communication system.

FIG. 1B is a block diagram of an embodiment of a MCN communication system 100 and its components. In the illustrated embodiment, the MCN communication system 100 includes a radio access component 150, control and data component 152 and a data store 154. The MCN communication system can further include and/or can communicate with an antenna, satellite dish, and the like, to receive data from UEs, other MCN communication systems, satellites, and the like. In an all-IP network architecture, the received data can all be in the form of IP data packets. In addition, the MCN communication system 100 can communicate with multiple base stations to increase its coverage area.

The control and data component 152 can be implemented using one or more computer processors, FPGAs, microcontrollers, etc., and performs the various operations of the MCN communication system 100. In an all-IP network architecture, such as a 4G LTE network, the control and data component 152 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-MCN communication system handovers. For idle state UEs, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the MCN communication system and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the MCN communication system.

Similarly, the control and data component 152 can perform the attachment and detachment of UEs, authentication procedures, gateway selection, managing PDN connections, UE tracking and paging, etc. The control and data component 152 can also handle the user data between the radio access component and an external IP network, packet routing and forwarding, handover functions between MCN communication systems, packet buffering initiation of network triggered service request procedures, quality of service policy enforcement, static policy, subscriber location management, subscriber data, and the like.

The control and data component 152 can perform additional procedures as will be described herein. For example, the control and data component 152 can communicate with other MCN communication systems to create a NOM, establish communications between UEs that are within the coverage area corresponding to the MCN communication system, identify MCN communication systems associated with UEs in other coverage areas, identify MCN communication systems that are available for handover operations, perform the synching operations with other MCN communication systems, identify non-responsive MCN communication systems, etc.

The data store 154 can include data regarding the UEs in communication with the MCN communication system 100 and within the coverage area corresponding to the MCN communication system 100, such as UE location, authentication keys, etc. In some embodiments, such as an all-IP network architecture or 4G LTE network, the data store 154 can include a home subscriber server (HSS).

The HSS can include subscription information for all UEs associated with the MCN communication system, or within a NOM. The HSS can store, for example, authentication parameters, security keys, and subscription information for UEs within the NOM or associated with the MCN communication system. Furthermore, the HSS can include subscriber location information and be involved with subscriber data handling, authentication procedures, etc.

Similarly, the data store 154 can further include data identifying other MCN communication systems within the NOM, location information of the MCN communication system within the NOM, communication protocols, data regarding the Master Device and Secondary devices of the NOM, data identifying all the UEs within the NOM and the coverage areas where the UEs are located, etc. The data in the data store 154 can be used by the control and data component 152 to manage the UEs in the coverage area.

As mentioned previously multiple MCN communication systems can be networked together to form a NOM. The MCN communication systems in the NOM can implement an all-IP based communication architecture, such as 4G LTE, to provide further functionality and flexibility. Furthermore, each MCN communication system in a NOM can include a unique identifier, such as an IP address, and each UE associated with each MCN communication system can include its own unique identifier, which can also be an IP address. The UEs can include, but are not limited to, cell phones, smart phones, tablet computers, personal computers, tracking devices, targeting devices, weapons systems, and/or any portable electronic device configured to communicate with one or more MCN communication systems.

To create a NOM, multiple MCN communication systems can be identified for association. The MCN communication systems can be identified by a user and/or automatically identified based on proximity to each other, radio signal communications between MCN communication systems, hierarchical information, and the like, as will be described in greater detail below. Further, the MCN communication systems can be associated together by associating their unique identifiers in a data store of one of the MCN communication system, or in some other location.

Once the MCN communication systems are associated together, one MCN communication system can be identified as the Master MCN communication system ("Master Device"), while the remaining MCN communication systems can be identified as the secondary MCN communication systems ("Secondary Device(s)"). Additional MCN communication systems can be added by identifying additional MCN communication systems, as described above, and associating the additional MCN communication systems with the MCN communication systems in the NOM.

The Master Device can retrieve data from each associated MCN communication system, such as the unique identifiers of the UEs within each coverage area, location information, and other configuration information to generate a database of all UEs throughout the NOM. The Master Device can then share the database of information, or parts thereof, with all of the Secondary Devices to ensure that every MCN communication system in the NOM includes the desired information. The Master Device can communicate with the Secondary Devices to retrieve and synch data via any number of communication technologies, including satellite communication, microwave or radio wave communication, OFDM, WiMAX, etc.

The data that is shared with all the MCN communication systems in the NOM can include a look-up table identifying the other MCN communication systems within the NOM, unique identifiers to communicate with different components of the MCN communication systems within the NOM, and the coverage area where the UEs in the NOM are located. Thus, when a first UE (UE1) within a coverage area (CA1) attempts to transmit data to a second UE (UE2), the UE1 can communicate with a first MCN communication system (the MCN communication system corresponding to the CA1) to obtain the unique identifier of UE2 and/or transmit the data for UE2 via the first MCN communication system.

In some embodiments, the MCN communication system can function in an independent mode where communication with other MCN communication systems or a backhaul communication is limited or non-existent. In such embodiments, upon receiving the request, the first MCN communication system can refer to the look-up table to determine whether the UE2 is within the CA1. If the UE2 is within CA1, the first MCN communication system can transmit the data from UE1 to UE2. The data can include any one or more types of communications, including, but not limited to, voice data, video data, e-mail, SMS data, picture data, files, etc. If the first MCN communication system determines that the UE2 is not within the CA1, the first MCN communication system can transmit a message to UE1 that communication with UE2 is not available, etc.

The MCN communication system can also function in a networked mode such that communication with UE2 is available whether or not the UE2 is located in CA1. When in the networked mode, when the first MCN communication system receives the data for transmission to UE2, the MCN communication system can forward the data for transmission to a backhaul link to be routed to UE2, regardless of whether UE2 is located within CA1. Thus, in some circumstances, when UE1 and UE2 are located in CA1, the data from UE1 will be transmitted from the first MCN communication system to the backhaul link and back down to be routed to UE2. In some embodiments, rather than using a backhaul link, the MCN communication system can communicate data from UE1 located in CA1 to UE2 located in CA2 via direct communication with another MCN communication system or via an intermediary, such as a satellite communication, microwave station, etc. Thus, in some embodiments, no backbone network is required to allow the MCN communication system to communicate directly with MCN communication system, or through one or more intermediary MCN communication systems. In some embodiments, the MCN communication system can automatically switch between the independent mode and the networked mode based on whether communication with other MCN communication systems or a backhaul communication is available.

As used herein, adjacent coverage areas can refer to coverage areas that have overlapping coverage and/or coverage areas that are close enough to each other such that a UE can move from one coverage area to another coverage area without losing the ability to communicate with at least one MCN communication system. Furthermore, as used herein, adjacent MCN communication systems refers to MCN communication systems corresponding to adjacent coverage areas.

In addition, to the look-up table of the MCN communication systems within the NOM and the UEs within the NOM, the Master Device can include information regarding communication with other devices outside the NOM, such as other Master Devices in other NOMs, other typical cellular networks, etc.

The NOM can also handle UE handover operations as well. To aid in handover operations, each MCN communication system can include a look-up table of other MCN communication systems with which a handover operation can be completed. For example, MCN communication systems that are in adjacent coverage areas can complete handover operations, while the MCN communication systems that are not in adjacent coverage areas cannot complete handover operations. To generate the look-up table, the MCN communication system can identify other MCN communication systems within its covered area, communicate with a Master Device, and/or refer to shared information previously transmitted from the Master Device.

To identify and track UE within their covered area, the MCN communication systems can sense a radio signal from the UE within the covered area or transmit broadcast messages and await replies from the UE. Upon identifying a new UE in the covered area, the MCN communication system can identify whether the UE is associated with another MCN communication system and, if so, communicate with the other MCN communication system to complete a handover operation. For example, if the UE1 is moving from the CA1 to an adjacent CA2, the MCN communication system corresponding to the CA1 can refer to the lookup table and determine that the UE1 is currently associated with the MCN communication system corresponding to the CA2. Accordingly, the two MCN communication systems can communicate to ensure any communication is not lost during the transition of the UE1 from the CA1 to the CA2.

As the MCN communication systems are likely to be moved during operation, in some embodiments, the Master Device can track the location of each MCN communication system within the NOM. In this way, the Master Device can use its own location information and the location information of the Secondary Devices to determine which MCN communication systems are adjacent and can complete a UE handover with other MCN communication systems.

If the Master Device determines that an MCN communication system has moved, it can update the relationship information with the Secondary Devices. Furthermore, if the Master Device detects movement, it can query the moving MCN communication system more frequently to ensure that all the MCN communication systems within the NOM have the most current information regarding adjacent MCNs, etc.

In addition, if a moving MCN communication system begins to detect a weak signal with a UE, the MCN communication system can communicate with the Master Device to determine what, if any, other MCN communication systems are available in the area of the UE. Based on the location information kept by the Master Device, the MCN communication system can identify a second MCN communication system for a possible handover of the UE.

In some embodiments, the Master Device can include location and adjacent coverage area information as part of the data that is shared with the Secondary Devices. Accordingly, in such embodiments, the MCN communication systems can refer to the shared data to identify the second MCN communication system for a possible handover of the UE.

In addition, Master Devices can use location information to track the location of MCN communication systems that are not part of the NOM. If a MCN communication system that is not part of the NOM moves such that it becomes adjacent to an MCN communication system in the NOM, the Master Device can incorporate the new MCN communication system as part of the NOM, or at least enable it to complete handover operations with the MCN communication system to which it is adjacent.

The Master Device can also monitor the activity and well-being of the MCN communication systems in the NOM. For example, if a Master Device does not receive any communication information from a MCN communication system for a threshold period of time, the Master Device can query the MCN communication system. If there is no response, the Master Device can sound an alarm, and/or perform any number of different functions. For example, the Master Device can delete, or make unavailable for communication, the UEs within the coverage area corresponding to the non-responsive MCN communication system. This information can then be shared with any remaining Secondary Devices.

Similarly if one or more Secondary Devices do not receive any communication information from the Master Device for a threshold period of time, the Secondary Device can query the Master Device. If the Master Device is unresponsive, a Secondary Device can then become the Master Device. In addition, the new Master Device can delete, or make unavailable for communication, the UEs within the coverage area corresponding to the non-responsive Master Device. The Secondary Device selected as the new Master Device can be based on any number of parameters, such as location, age, firmware/software updates/revisions, etc., as will be described in greater detail below.

Figure 2:
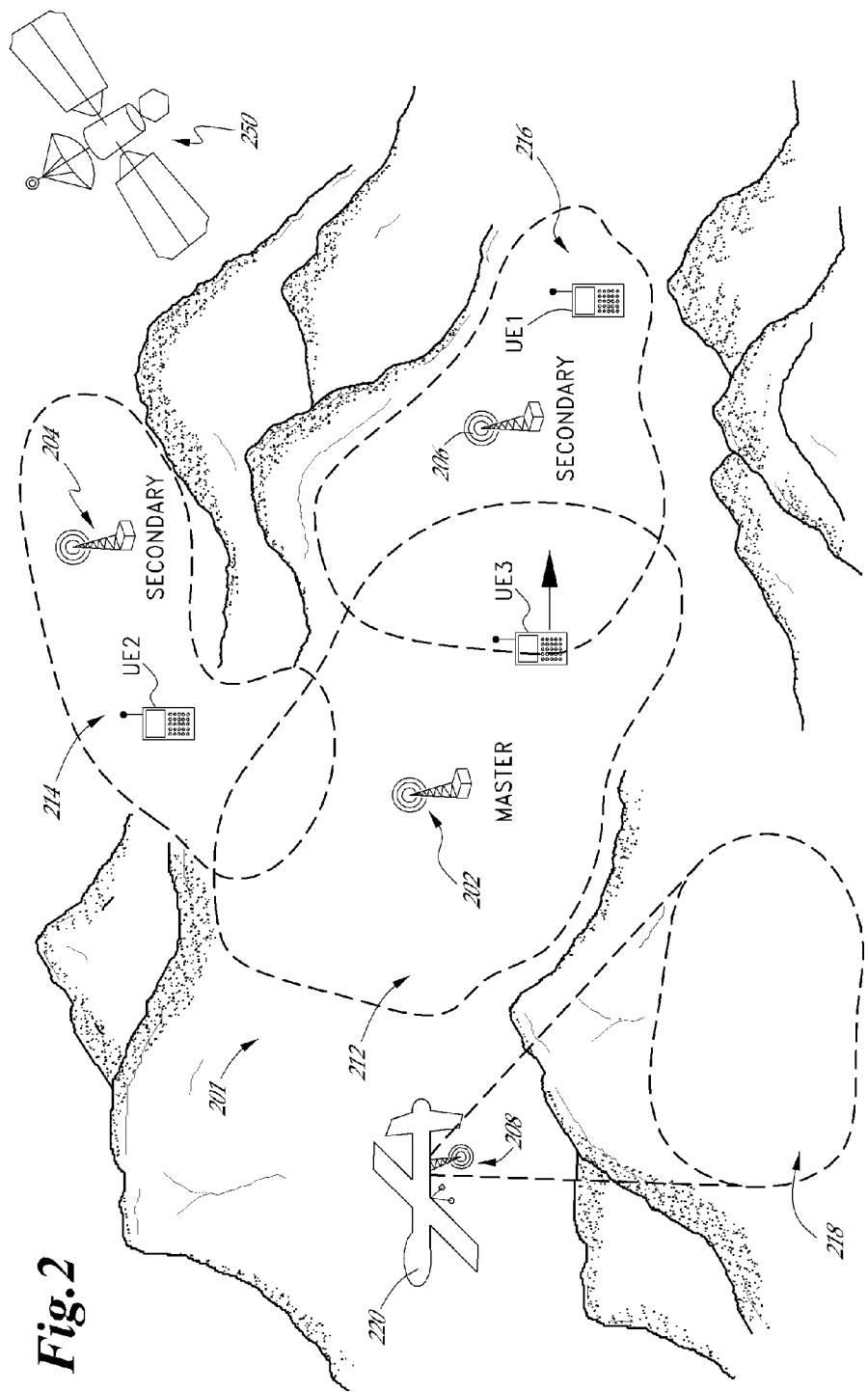
FIG. 2 is a diagram of an embodiment of a network of MCN communication systems (NOM) in a region.

FIG. 2 is a diagram of an embodiment of a NOM 201 and a satellite 250. In the illustrated embodiments, the NOM 201 includes a Master Device 202 and three Secondary Devices 204, 206, 208. In addition, the NOM 201 includes the coverage area 212 that corresponds to the Master Device 202 and the coverage areas 214, 216, 218 that correspond to the Secondary Devices 204, 206, 208, respectively.

In the illustrated embodiment, some of the coverage areas 212, 214, 216 are managed by MCN communication systems 202, 204, 206 that are on the ground. However, as illustrated with MCN communication system 208, the MCN communication systems can be located on a moving object, such as an airplane, drone 220, automobile, ship, boat, or other vehicle. Furthermore, as illustrated, the coverage areas 212, 214, 216 are adjacent to each other, while coverage area 218 is not adjacent to any of the other coverage areas.

The MCN communication systems 202, 204, 206, and 208 that form the NOM 201 can communicate with each other via any one of, or a combination of, satellite communication, microwave or radio wave communication, OFDM, WiMAX, etc. In the illustrated embodiment, the MCN communication systems 202, 204, 206, and 208 communicate via the satellite 250.

NOM Creation

As mentioned previously, the MCN communication systems 202, 204, 206, and 208 can be networked together to form the NOM 201. Each MCN communication system 202, 204, 206, and 208 can be identified using a unique identifier, such as an IP address, MAC address, device name, random number, etc.

In some embodiments, the MCN communication systems 202, 204, 206, and 208 can be associated together using the unique identifiers. For example, a user at one of the MCN communication systems can identify the MCN communication systems 202, 204, 206, and 208 using a user interface and then associate them with each other.

In certain embodiments, the MCN communication systems 202, 204, 206, and 208 can be automatically associated together based on one or more factors. For example, the MCN communication systems 202, 204, 206, and 208 can be associated based on their proximity, radio communications, location, hierarchical information, etc.

In some embodiments, an MCN communication systems (e.g., 202) can perform a search for other MCN communication systems within its covered area by broadcasting a query for other MCN communication systems to answer. An MCN communication system (e.g., 202) can also identify other MCN communication systems that are in proximity to it by querying location information of other MCN communication systems via a satellite communication. Other MCN communication systems (e.g., 204, 206, 208) that can be associated with the querying MCN communication system can respond with their location. If the location is within a predefined or dynamically selected distance, the MCN communication systems can be associated. For example, in some embodiments, adjacent MCN communication systems can be associated. In certain embodiments, MCN communication systems within the predefined area can be associated regardless of whether they are adjacent.

In addition, MCN communication systems can be associated based on an identification of the MCN communication system and/or a group or hierarchy identification. For example, if a company of soldiers has multiple MCN communication systems (e.g., 202, 204, 206, 208) spread out across different platoons, the MCN communication systems 202, 204, 206, 208 corresponding to the different platoons can be automatically associated together to form a NOM based on their relationship within the company. For example, a look-up table containing identifiers of the platoons of a company and the identifiers of the MCN communication systems associated with platoons can be used to associate the MCN communication systems together to form a NOM. In some embodiments, this can be done regardless of the distance between the platoons.

In some embodiments, upon detecting the other MCN communication systems 204, 206, 208, the MCN communication system 202 can perform a security check to determine whether it can associate with the other MCN communication systems 204, 206, 208. If the second MCN communication systems 204, 206, 208 pass the security check, the MCN communication systems 202, 204, 206, 208 can be associated to form a NOM. In certain embodiments, upon detecting the MCN communication systems 202, 204, 206, 208 are associated without a security check.

Once the MCN communication systems 202, 204, 206, 208 have been associated, in some embodiments, a user can select one of the MCN communication systems 202, 204, 206, and 208 as the Master Device. In the illustrated embodiment, MCN communication system 202 is selected as the Master Device 202. The remaining MCN communication systems 204, 206, and 208 are then identified as the Secondary Devices 204, 206, and 208. However, any one of the MCN communication systems 202, 204, 206, 208 can be selected as the Master Device.

In certain embodiments, the Master Device 202 can be selected, or identified, automatically based on one or more factors. For example, the Master Device 202 can be selected based on its elevation. The elevation can be obtained from a GPS unit or similar device. For example, coverage areas corresponding to MCN communication systems at higher elevations can have a greater coverage area and therefore be more desirable as a Master Device. Further, in battlefield conditions, MCN communication systems at higher elevations may be safer. Accordingly, in some embodiments, the MCN communication system at a higher elevation or the highest elevation can be selected as the Master Device. In certain embodiments, the MCN communication system at a lower elevation, or the lowest elevation, can be selected as the Master Device.

In some embodiments, the Master Device is selected based on which MCN communication system has the strongest and/or most reliable connection with a backhaul link. In certain embodiments, the Master Device 202 can be selected based on the range of the corresponding coverage area. The MCN communication systems can analyze radio strength, frequency spectrum, surrounding terrain features (e.g., elevation changes, climate, etc.), and other factors to estimate the range of the different coverage areas. The terrain features can be obtained by determining the location of the MCN communication systems using a global-positioning satellite system (GPS) or other location identification system and using one or more maps, such as a topographical map, etc. In some embodiments, the MCN communication system corresponding to the coverage area with the largest coverage area can be selected as the Master Device. In certain embodiments, the coverage area with the smallest range or middle range can be selected as the Master Device. In certain embodiments, the Master Device 202 can be selected based on its location. For example, the MCN communication system that is closest to or farthest away from a command center can be selected as the Master Device. Location information of the command center can be compared with location information of the MCN communication systems to determine the distance between the them.

Furthermore, the Master Device can be selected based on an identifier of the MCN communication systems and/or an identifier of the group associated with the MCN communication system. With reference to the example above regarding the NOM composed of MCN communication systems associated with platoons in a company, the MCN communication system associated with the company commander can be automatically designated as the Master Device.

Once the Master Device 202 has been selected, the Master Device 202 obtains various types of information from the Secondary Devices 204, 206, 208. For example, the Master Device 202 can obtain the UE information regarding the UEs in the different coverage areas 212, 214, 216, 218. The Master Device 202 can also obtain additional information from the MCN communication systems 202, 204, 206, 208, such as the location of each MCN communication systems 202, 204, 206, 208, network configuration parameters, error information, and the like. In some embodiments, the Master Device 202 does not obtain any information, but simply passes information along to the Secondary Devices 204, 206, 208, such as UEs that are registered with the NOM and other NOM data.

Once the Master Device 202 has obtained the information from the different MCN communication systems 202, 204, 206, 208, the Master Device 202 generates data that is to be shared between the MCN communication systems 202, 204, 206, 208. The generated data can also be referred to as NOM data. The Master Device transmits the NOM data to all of the Secondary Devices 204, 206, 208. In this way, all of the MCN communication systems 202, 204, 206, 208 include all of the information regarding the NOM. In some embodiments, the NOM data includes all the data found on the Master Device, including information regarding other NOMs. In certain embodiments, the NOM data only includes data concerning a particular NOM.

Additional MCN communication system can be added to the NOM 201 as desired. In some embodiments, a user can associate a new MCN communication system to the other MCN communication systems that already form part of the NOM 201. In certain embodiments, a new MCN communication system can be added based on the factors described above, such as proximity to the NOM, hierarchical information, etc. Once the new MCN communication system is added, the Master Device 202 retrieves the user data and other information from the new MCN communication system. The Master Device 202 updates its NOM data and then transmits the NOM data to all of the Secondary Devices 204, 206, 208, and the new MCN communication system.

Communication Between UEs in a NOM

The NOM 201 allows for communications between UEs in different coverage areas. As part of the NOM data received from the Master Device 202, each of the Secondary Devices 204, 206, 208 can include information regarding where the UEs in the NOM are located. Using this information, the Secondary Devices 204, 206, 208 can transmit data between UEs in different coverage areas. If one UE requests a transmission of data to another UE in the same coverage area, the corresponding MCN communication system can authenticate the requesting UE by communicating with the Master Device. In some embodiments, such as when the MCN communication system is in networked mode, once the UE has been authenticated, the data from the UE can be transmitted to a backhaul communication link for routing.

For example, if the UE1, located in coverage area 216, seeks to transmit data to the UE2, in the coverage area 214, the UE1 can send the data for transmission to the Secondary Device 206. If the Secondary Device 206 is in networked mode it can authenticate the UE1 with the NOM by communicating with the Master Device 202. Once authenticated, the Secondary Device 206 can forward the data from the UE1 to the backhaul communication link via satellite 250 for routing to UE2. Using standard IP routing techniques, the data will eventually be routed to the UE2 via the MCN communication system 204.

However, if the UE1 and the UE2 are both located in coverage area 216 and the MCN communication system 204 is in independent mode, the MCN communication system 204 can authenticate UE1 by reviewing the NOM data and then transmitting the data to the UE2. In some embodiments, even when in networked mode, the MCN communication system 204 can authenticate the UE1 using the NOM data stored thereon, determine whether the UE2 is in the coverage area 216, and, if so, transmit the data to the UE2 without using the backhaul communication link, or communicating with the Master Device 202.

Handover Operations

The NOM 201 also allows UEs to roam between adjacent coverage areas. In the illustrated embodiment, coverage areas 212, 214, and 216 are adjacent, and a handover occurs when a UE moves from one coverage area into another adjacent coverage area. During the movement from one coverage area to the other coverage area, the two corresponding MCN communication systems communicate to handover the communications of the UE so that any communication links between the UE and any other UEs are not lost.

For example, if UE3 is located in coverage area 212 and begins moving into coverage area 216, the Secondary Device 206 can detect the presence of UE3 within coverage area 216. As UE3 continues to move into the coverage area 216, the Master Device 202 detects a weakening radio signal. As the radio signal between UE3 and the Secondary Device 206 strengthens and the radio signal between UE3 and the Master Device 202 weakens, the Master Device 202 and the Secondary 206 can communicate directly to ensure that any communication between the UE3 and any other UEs is not lost. In certain embodiments, the Master Device 202 and the Secondary Device 206 can communicate via a backhaul link, such as via a satellite or other device. In addition, the Master Device 202 can update the NOM data regarding the location of UE3 and transmit the updated NOM data to the Secondary Devices 204, 206, 208. Thus, every MCN communication system 202, 204, 206, 208 can include the updated NOM data with the location of all the UEs within the NOM and other information.

Figure 3:
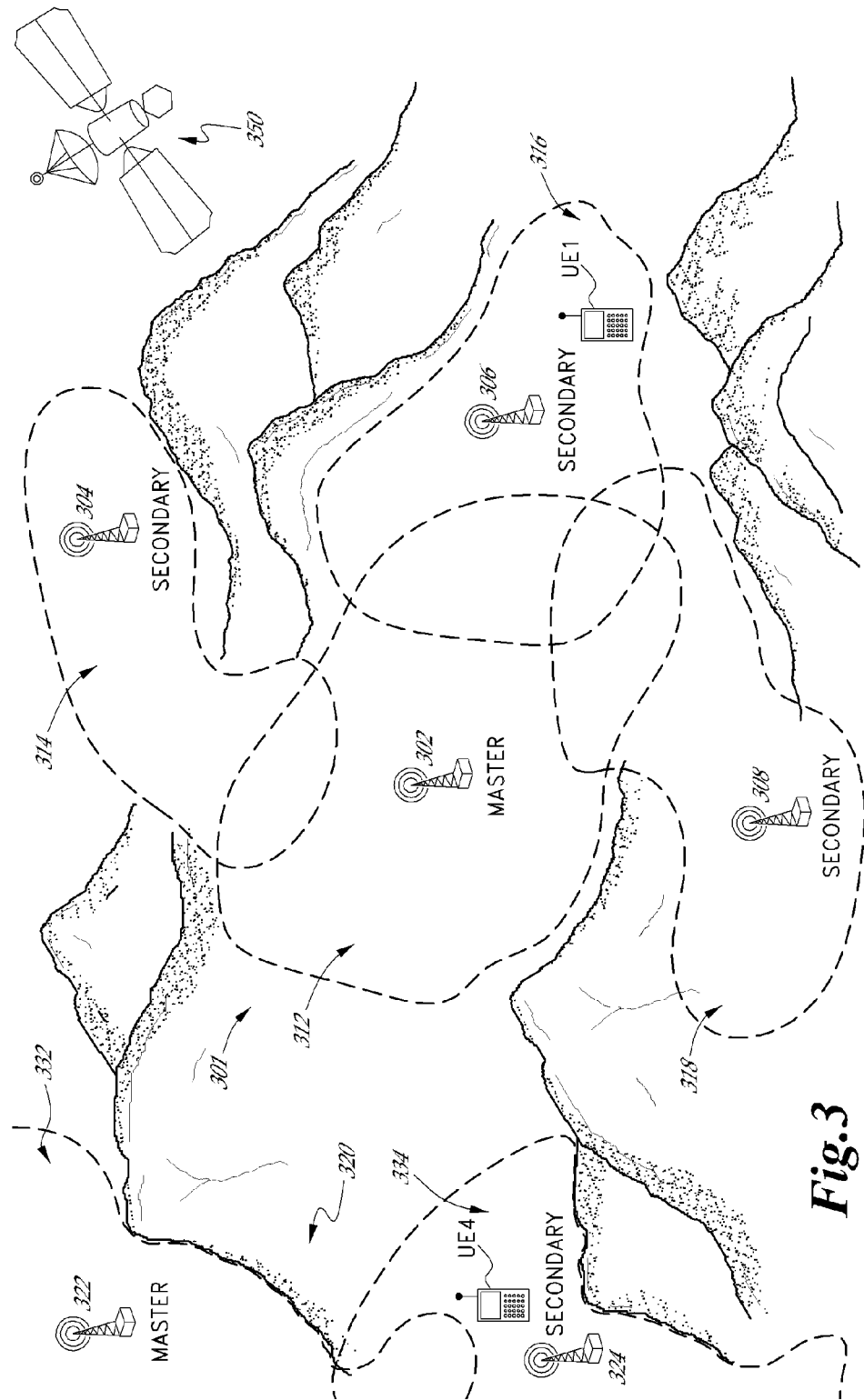
FIGS. 3-5 are diagrams of embodiments of multiple NOMs within a region.

FIG. 3 is a diagram of an embodiment of multiple NOMs: NOM 301 and NOM 320, and a satellite 350. The NOM 301 includes a Master Device 302, its corresponding coverage area 312, three Secondary Devices 304, 306, 308, and the coverage areas 314, 316, 318 corresponding to the Secondary Devices, 304, 306, 308, respectively. The NOM 320 includes a Master Device 322, its corresponding coverage area 332, one Secondary Device 324, and its corresponding coverage area 334.

The NOMs 301, 320 operate in a manner similar to the NOM 201, describe above with reference to FIG. 2. Furthermore, the NOMs 301, 320 can communicate with each other via the Master Devices 302 and 322. For example, in the illustrated embodiment, the Master Devices 302 and 322 can communicate via the satellite 350. In some embodiments, the Master Devices in different NOMs can communicate using any one or a combination of communication technologies, similar to the communication technologies used for communication between MCN communication systems within a NOM, described previously.

In addition to communication links between UEs in different coverage areas within a NOM, communication links between UEs in different NOMs can be established. For example, if the UE1, located in coverage area 316 of NOM 301, requests to communicate with the UE4, located in the coverage area 334 of the NOM 320, the UE1 can request a communication link to the UE4 from the Secondary Device 306. The Secondary Device 306 can review the NOM data of NOM 301 to determine where the UE4 is located.

In some embodiments, the NOM data in the Secondary Device 306 does not include information regarding other NOMs. In such embodiments, the Secondary Device 306 will be unable to identify the location of the UE4, but can communicate the communication request to the Master Device 302. The Master Device 302 can communicate with the Master Device 322 of the NOM 320 to determine whether the UE4 is located within the NOM 320. The NOM 320 can review its NOM data and determine that the UE4 is located within the coverage area 334.

The Master Device 322 can supply communication link data to allow a communication link between the UE1 in coverage area 316 and the UE4 in coverage area 334 to the Master Device 302. In turn, the Master Device 302 can provide the communication link data to the Secondary Device 306. Using the communication link data, the Secondary Device 306 can establish the communication link between the UE1 and the UE4.

In certain embodiments, the NOM data in the Secondary Device 306 can include information regarding other NOMs (e.g., the NOM 320). In such embodiments, the Secondary Device 306 can request the Master Device 302 to communicate with the Master Device 322 of the NOM 320, and to establish the communication link between the UE1 and the UE4. Alternatively, the Secondary Device 306 can communicate with the NOM 320 without the aid of the Master Device 302.

Moving MCN Communication Systems

Figure 4:
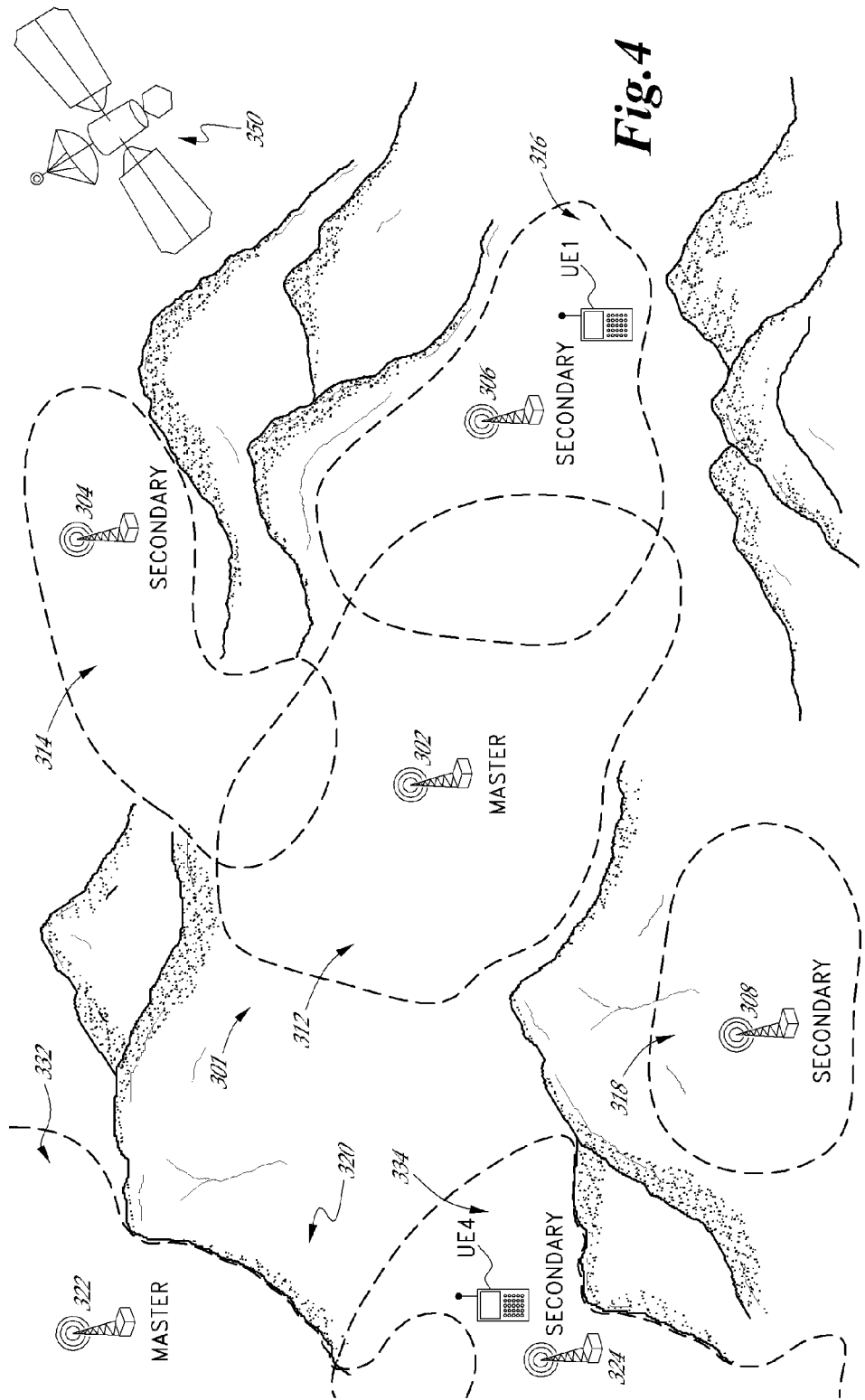

FIG. 4 is a diagram of an embodiment of the NOMs 301, 320 where the Secondary Device 308 has moved away from the MCN communication systems in the NOM 301, and is no longer adjacent to the Master Device 302 and the Secondary Device 306. As described previously with reference to FIG. 2, despite the distance between coverage area 318 and the other coverage areas in the NOM 301, the UEs within the coverage area 318 can still communicate with the UEs in the NOM 301. However, as the coverage area 318 is no longer adjacent to the coverage area 312 and the coverage area 316, handover functionality is lost. For example, UEs cannot move from the coverage area 318 to the coverage area 312 or the coverage area 316 without losing a radio or communication signal.

The Master Device 302 can identify the movement to determine the loss, or potential loss of handover functionality. In some embodiments, as part of the communications between the Master Device 302 and the Secondary Devices 304, 306, 308, the Master Device 302 can obtain location information of the Secondary Devices. The Master Device 302 can then use the location information and signal information of the Secondary Devices 304, 306, 308, and terrain information to determine which coverage areas are adjacent and where handovers can occur. If the Master Device 302, determines that two coverage areas are no longer adjacent, the Master Device 302 can communicate the change to the two corresponding MCN communication systems so that handovers are no longer allowed.

In addition, as the Master Device 302 receives location information, if it detects that an MCN communication system has moved, or is moving (e.g., the MCN communication system 308), the Master Device 302 can monitor the movement of the moving MCN communication system 308. Based on the speed of movement and duration, the Master Device 302 can predict when handover operations will no longer be possible between the adjacent coverage areas, and communicate the predicted time and change to the Secondary Devices 304, 306, 308 as part of the NOM data. The MCN communication systems affected by the possible change can then monitor UEs that are in the process of a handover or are getting close to a handover situation. A message to the UEs can be provided regarding the movement of the coverage area/MCN communication system. The message can notify the UE that reception is about to be lost. The message can also provide location information (such as longitude/latitude coordinates, a map, etc.) of other coverage areas in the area where reception can be obtained, or can notify the UE that it is being associated with a different MCN communication system in the area.

Furthermore, UEs that are within the range of the moving coverage area and an adjacent affected coverage area can be identified. The UEs that are detected as moving with the moving MCN communication system can be handed over to the moving MCN communication system (if not already associated with the moving MCN communication system) and the UEs that are detected as not moving can be handed over to the other MCN communication system (if not already associated with the other MCN communication system) as desired.

In some instances, a UE may only be within the range of the moving coverage area, and not move with the moving MCN communication system. In such instances, once the movement of the moving MCN communication system is detected and as the radio signal between the non-moving UE and the moving MCN communication system weakens, the moving MCN communication system can provide location information (e.g., longitude/latitude coordinates, directions, etc.) of another coverage area, such as the next closest coverage area, that is part of the NOM to the non-moving UE. In this way, the non-moving UE can move to another coverage area that is part of the NOM. In some embodiments, the location information can be in the form of a map showing the coverage of the NOM so that the user of the UE can select where they should go to receive coverage.

In some embodiments, the moving/non-moving UEs can be identified by detecting radio signal strength between the UE and the moving MCN communication system. If, for example, during movement of the moving MCN communication system, the radio signal strength between the UE and the moving MCN communication system weakens beyond a threshold level, the UE can be handed over to another MCN communication system (if it is not already associated with the other MCN communication system). If the radio signal strength between the UE and the moving MCN communication system remains approximately the same, the UE can be handed over to the moving MCN communication system (if it is not already associated with the moving MCN communication system).

In certain embodiments, the moving/non-moving UEs can be identified as moving or not based on location information, such as GPS or other location identification technology. If the UEs are moving in approximately the same direction and approximate speed as the moving MCN communication system, the UEs can be handed over to the moving MCN communication system (if it is not already associated with the moving MCN communication system). If the UEs are not moving in the same approximate direction and approximate speed as the moving MCN communication system, the UEs can be handed over to another MCN communication system (if it is not already associated with the other MCN communication system).

In addition, while the MCN communication system is moving, the UEs associated with the moving MCN communication system can be locked in or protected as part of the moving MCN communication system, regardless of whether additional coverage areas are passed or the UEs have a stronger signal quality or strength with another MCN communication system. For example, if moving MCN communication system 308 moved through coverage area 312 and coverage area 314, the UEs associated with MCN communication system 308 would not be handed over to MCN communication systems 302, 304, even if the signal quality or strength with the MCN communication systems 302, 304 is better than the signal quality with MCN communication systems 308.

Figure 5:
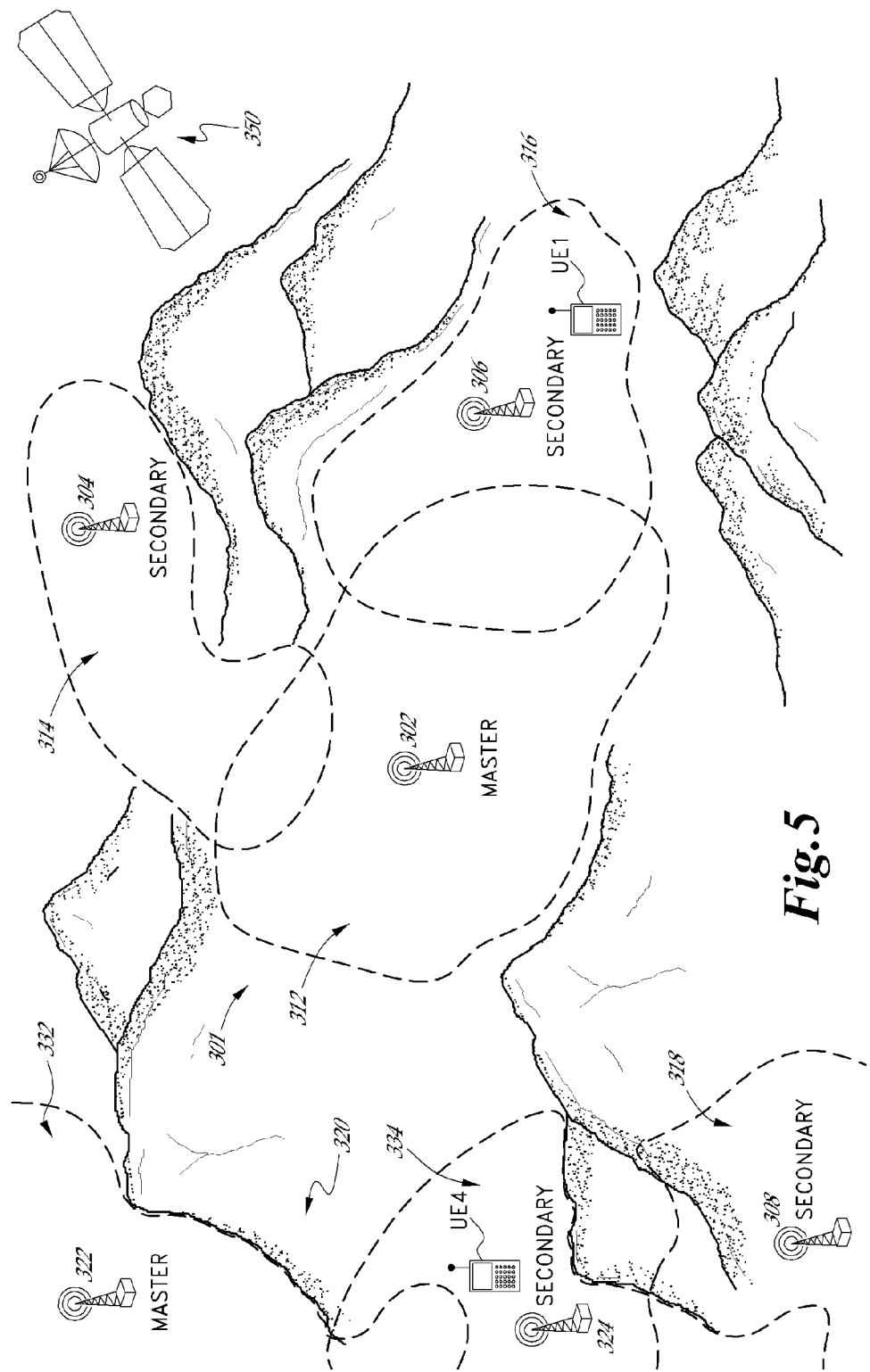

FIG. 5 is a diagram of an embodiment of the NOMs 301, 320 where the Secondary Device 308 has moved farther away from the MCN communication systems in the NOM 301, and is now adjacent to the Secondary Device 324 of NOM 320. As discussed in greater detail above, despite the movement and distance between the coverage area 318 and the rest of the NOM 301, the UEs within the coverage area 318 can still communicate with UEs in the rest of the NOM 301.

In some embodiments, the Master Device 302 includes the location information of the Master Device 322 and the NOM 320. Using the location information, radio strength information, and terrain information, the Master Device 302 can determine whether the coverage area 318 is adjacent to an coverage area of the NOM 320. If the Master Device 302 determines that the coverage area 318 is adjacent to an coverage area of the NOM 320, the Master Device 302 can provide the Master Device 322 with information regarding the Secondary Device 308. The information can include location information, UE information, and communication information to allow the Master Device 322 to communicate with the Secondary Device 308.

In some embodiments, the Master Device 322 can share the NOM data of the NOM 320 with the Secondary Device 308 and the Secondary Device 308 can share its UE information with the Master Device 322, thereby allowing UEs within the NOM 320 to communicate with the UEs in the coverage area 318. In addition, the Master Device 322 can allow handover operations between the coverage area 318 and any coverage areas adjacent to the coverage area 318 (e.g., the coverage area 334).

In some embodiments, the sharing of NOM data with the Secondary Device is temporary. In certain embodiments, the sharing of the NOM data is permanent and the Secondary Device 308 becomes a part of the NOM 320. In some embodiments, the Secondary Device 308 can be part of both NOMs 301, 320 as long as the Secondary Device is adjacent to the NOM 320. Once the Secondary Device 308 is no longer adjacent to the NOM 320, it can be removed from the NOM 320. In certain embodiments, the Secondary Device 308 can be part of both NOMs 301, 320 indefinitely. In some embodiments, once the Secondary Device 308 becomes part of the NOM 320, it is no longer a part of the NOM 301. In such an embodiment, the NOM 301 can remove NOM data related to the Secondary Device 308.

Master Device Change in a NOM

Figure 6:
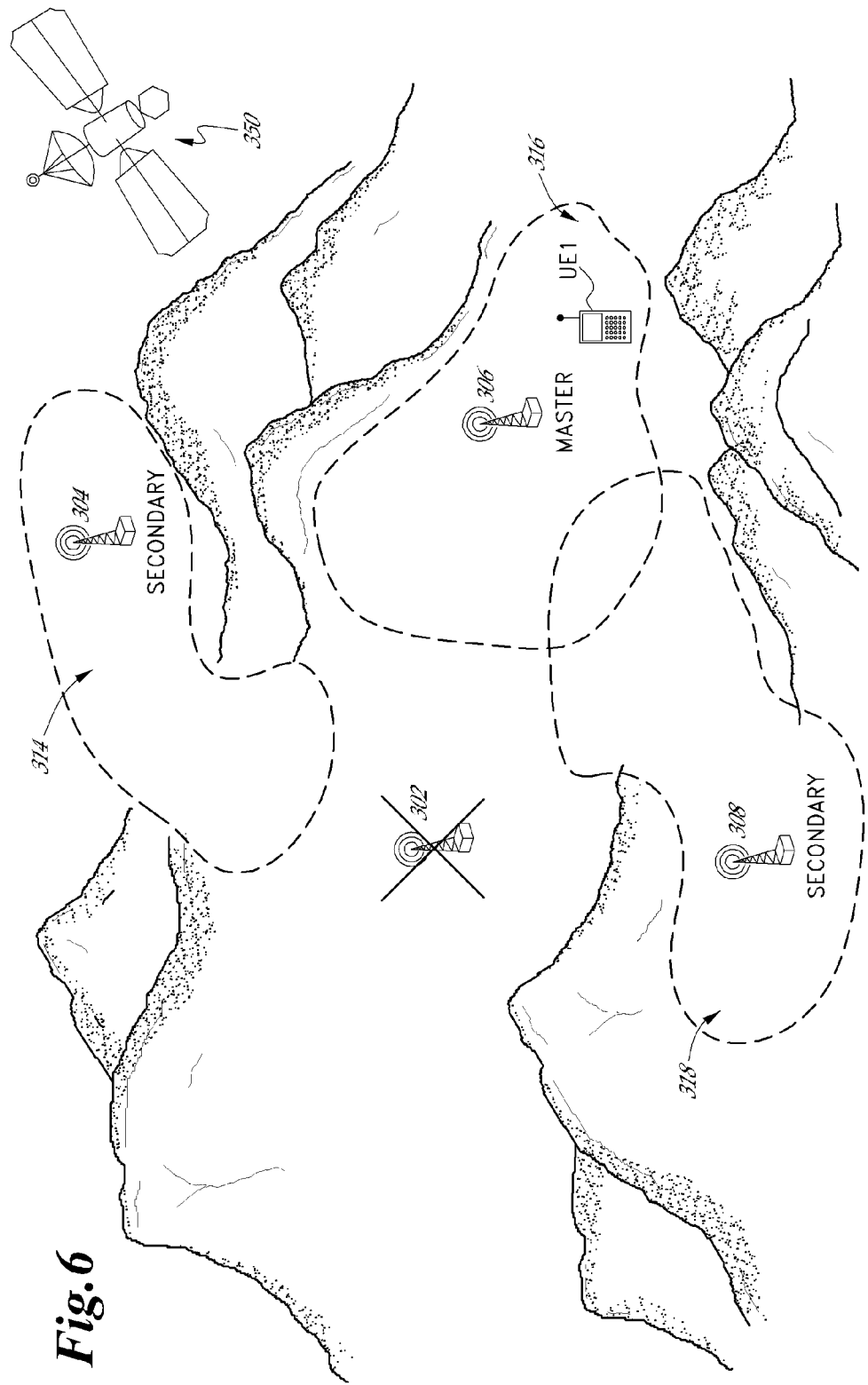
FIG. 6 is a diagram of an embodiment of a NOM in a region.

FIG. 6 is a diagram of an embodiment of the NOM 301 where the Master Device 302 is no longer functional or no longer a part of the NOM 301. During operation, the Master Device 302 and Secondary Devices 304, 306, 308 can communicate at regular intervals and/or at frequent intervals. In some embodiments, if one or more of the Secondary Devices (e.g., the Secondary Device 306) does not receive a communication from the Master Device 302 for a threshold period of time, the Secondary Device 306 can query the Master Device 302 to ensure the Master Device 302 is functioning properly. If the Secondary Device 304, 306, 308 does not receive a response from the Master Device 302, it can communicate with the other Secondary Devices 304, 308. If the Secondary Device 306 cannot establish communication with the other Secondary Device 304, 308, it can change to an independent mode and operate without being part of a NOM.

However, if the Secondary Device 306 is able to establish communication with one or more of the other Secondary Devices, a new Master Device can be selected from among the Secondary Devices 304, 306, 308. In addition, the Secondary Devices 304, 306, 308 can record the last known location of the old Master Device 302 for further reference. In this manner, one or more parties can conduct an investigation to determine what happened to the Master Device 302.

The new Master Device can be selected using one or more parameters, similar to the parameter used to select the first Master Device, described in greater detail above with reference to FIG. 2, and/or other parameters. For example, the new Master Device can be automatically selected based on location information. In some instances, it may be beneficial to select the Secondary Device furthest from the Master Device as the new Master Device when the NOM is in a battlefield location because the Master Device may have been destroyed and the MCN communication system furthest from the destroyed Master Device may be the safest MCN communication system. Accordingly, the Secondary Device farthest from the Master Device can be selected as the new Master Device. Alternatively, in some instances, personnel operating the Master Device may be able to more easily reach the MCN communication system that is closest to the old Master Device. Accordingly, the Secondary Device nearest the old Master Device can be selected as the new Master Device.

The new Master Device can also be automatically selected based on its age or version number. For example, a newer MCN communication system may be preferred over an older MCN communication system due to improvements in technology, etc. Alternatively, older MCN communication system may be selected because it has been proven to work over time. In some embodiments, MCN communication system with a certain version or revision number can be selected. The version or revision number can correspond to an updated version or version that includes an important update or function.

Similar to the detection of a malfunctioning Master Device, malfunctioning Secondary Devices can be detected. For example, if a Master Device has not received any communication from a Secondary Device within a threshold period, the Master Device can query the Secondary Device. If the Master Device does not receive a response, the Master Device can log the last known location of the Secondary Device and update the NOM data to remove references to the UEs in the coverage area corresponding to the Secondary Device and other related data. Any other Secondary Devices can receive the updated NOM data from the Master.

Figure 7:
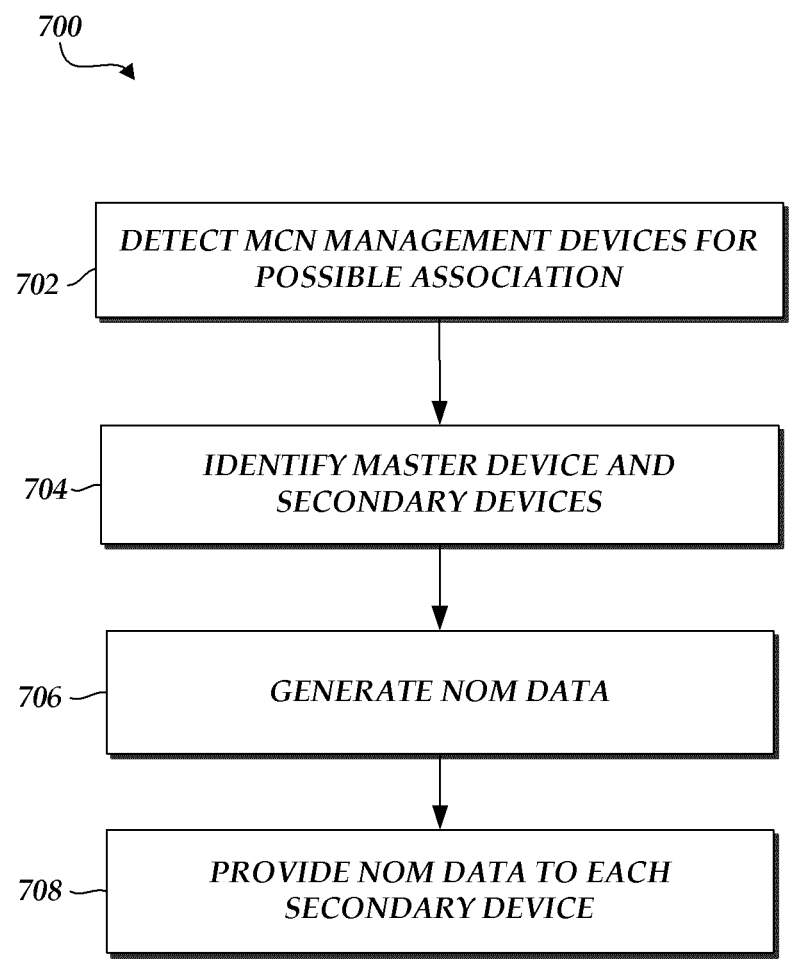
FIG. 7 is a flow diagram illustrative of an embodiment of a routine implemented by an MCN communication system for creating a NOM.

FIG. 7 is a flow diagram illustrative of one embodiment of a routine 700 implemented by an MCN communication system for creating a NOM. One skilled in the relevant art will appreciate that the elements outlined for routine 700 may be implemented by one or many computing devices/components that are associated with the MCN communication system. Accordingly, routine 700 has been logically associated as being generally performed by the MCN communication system, and thus the following illustrative embodiments should not be construed as limiting.

At block 702, the MCN communication system identifies one or more additional MCN communication systems for possible association. As described in greater detail above, MCN communication system can identify the one or more additional MCN communication systems based on user input, location information of the one or more additional MCN communication systems, responses to a broadcast query from the MCN communication system, etc.

At block 704, the MCN communication system identifies a Master Device from among all of the MCN communication systems. As described in greater detail above, the Master Device can be identified using one or more factors. For example, the Master Device can be identified based on user selection, elevation, coverage area range, location, etc. The remaining MCN communication systems can be identified as Secondary Devices.

At block 706, the Master Device generates NOM data based on UE data, configuration data, and/or other data. In some embodiments, this data can be received from the Secondary Devices and similar data found in the Master Device. In certain embodiments, this data is entered at the Master Device. As described in greater detail above, the Master Device can receive various pieces of information from the associated MCN communication systems. For example, the Master Device can receive data regarding UEs in the corresponding coverage areas, network configuration of the MCN communication systems, location information, error information, etc. At block 708, the Master Device provides the NOM data to each Secondary Device.

Figure 8:
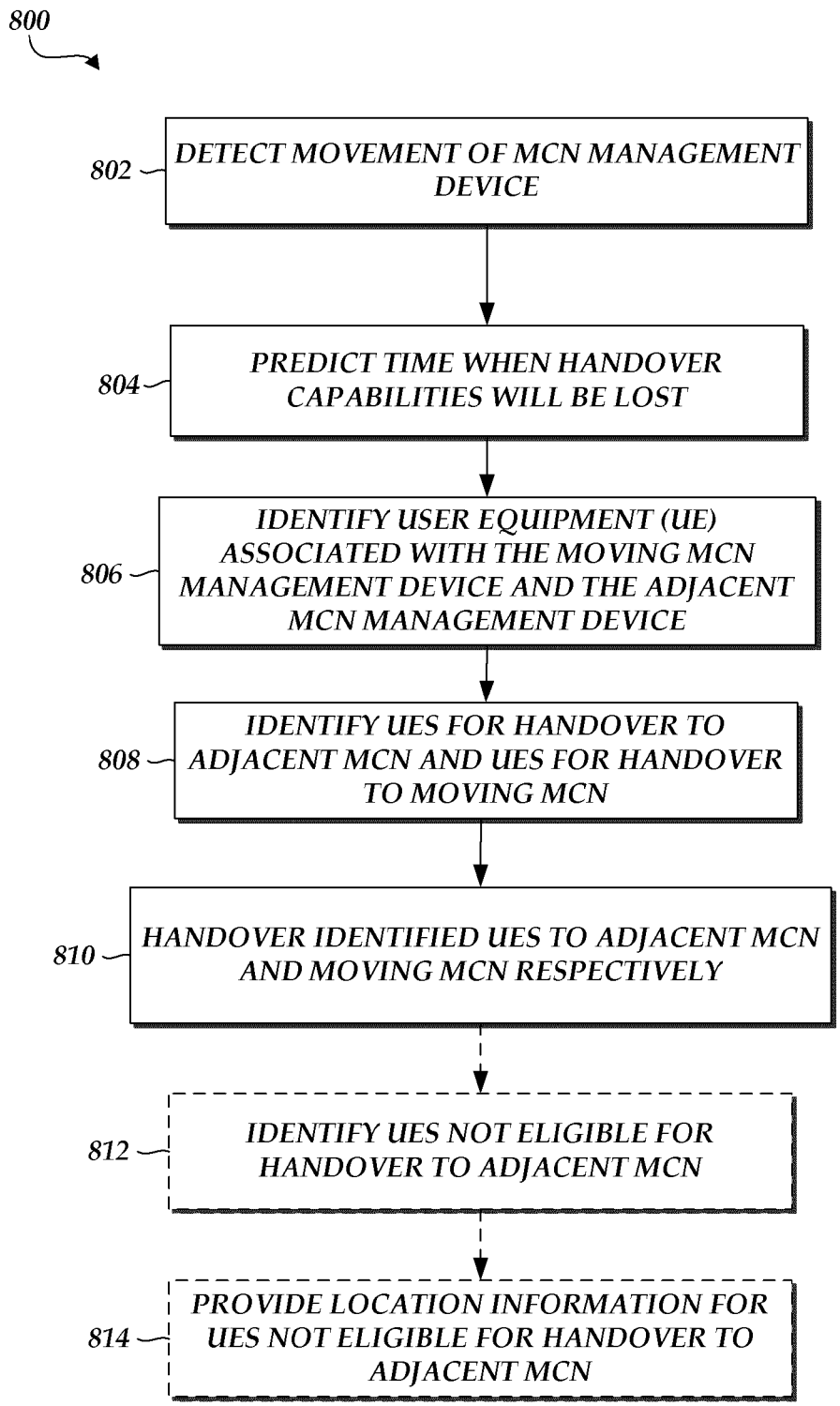
FIG. 8 is a flow diagram illustrative of an embodiment of a routine implemented by an MCN communication system for associating UEs with MCN communication systems during the movement of an MCN communication system.

FIG. 8 is a flow diagram illustrative of one embodiment of a routine 800 implemented by an MCN communication system for associating UEs with MCN communication systems during the movement of an MCN communication system. One skilled in the relevant art will appreciate that the elements outlined for routine 800 may be implemented by one or many computing devices/components that are associated with the MCN communication system. Accordingly, routine 800 has been logically associated as being generally performed by the MCN communication system, and thus the following illustrative embodiments should not be construed as limiting.

At block 802, the MCN communication system detects movement of an MCN communication system. The detected movement may be of the MCN communication system itself or of another MCN communication system, such as a Master Device detecting movement of a Secondary Device. Location information can be compared at different times, and movement can be detected when the location information changes from one time to a second time. In addition, using the location information, the direction of the movement can also be determined.

Based on the speed, direction, and/or other information of the moving MCN communication system, the MCN communication system can predict when handover capabilities between the moving MCN communication system and any adjacent MCN communication systems will be lost, as illustrated in block 804.

At block 806, the MCN communication system identifies UEs in the moving MCN communication system and the UEs in the adjacent MCN communication system that may be affected by the movement. For example, the MCN communication system can identify UE's that can communicate with the moving MCN communication system and the adjacent MCN communication system. Some of the identified UEs may be associated with the moving MCN communication system, while others may be associated with the adjacent MCN communication system. As the moving MCN communication system is moving away from the adjacent MCN communication system, some of the identified UEs may lose the ability to communicate with the MCN communication system to which it is associated. For example, some of the UEs associated with the moving MCN communication system may not move with the MCN communication system, while some of the UEs associated with the adjacent MCN communication system may move with the moving MCN communication system.

At block 808, the MCN communication system identifies UEs for handover to the adjacent MCN communication system and UEs for handover to the MCN communication system. For example, the MCN communication system can identify UEs associated with the moving MCN communication system that are losing radio signal with the moving MCN communication system as UEs for handover to the adjacent MCN communication system. Similarly, the MCN communication system can identify UEs associated with the adjacent MCN communication system that are losing radio signal with the adjacent MCN communication system (e.g., UEs moving with the moving MCN communication system) as UEs for handover to the moving MCN communication system. At block 810 the MCN communication system can handover the UEs to the respective MCN communication system as identified in block 808.

Additional, fewer or different blocks can be used to implement the routine 800. For example, as illustrated at block 812, the MCN communication system can identify UEs associated with the moving MCN communication system that are not moving with the moving MCN communication system and are not eligible for a handover to the adjacent MCN communication system. For example, some UEs within the moving MCN communication system may not be within range of other coverage areas. Accordingly, as the moving MCN communication system moves away from these UEs, the UEs will lose their ability to communicate with other UEs.

Once the UEs that are not eligible for handover to an adjacent MCN communication system are identified, the MCN communication system can provide the identified UEs with information regarding where another coverage area is located, as illustrated at block 814. In this way the UE can be moved to the other coverage area to continue communications.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples.

What is claimed is:

1. A network of mobile cellular networks comprising:
a first mobile cellular network (MCN) communication system located within a first covered area and configured to generate a first MCN for the first covered area, the first MCN communication system comprising:
a first radio access component configured to receive wireless communications from one or more first user equipment within the first covered area,
a first control and data component in communication with the first radio access component and configured to provide first communication links between the one or more first user equipment within the first covered area, and
a first data store comprising:
authentication data of the one or more first user equipment within the first covered area,
identification data of one or more additional MCN communication systems,
location data of the one or more additional MCN communication systems, and
identification data of user equipment associated with the one or more additional MCN communication systems,
wherein the first MCN communication system independently provides the first communication links between the one or more first user equipment without communication to another MCN communication system; and
a second MCN communication system located within a second covered area and configured to generate a second MCN for the second covered area, the second MCN communication system comprising:
a second radio access component configured to receive wireless communications from one or more second user equipment within the second covered area,
a second control and data component in communication with the second radio access component and configured to provide second communication links between the one or more second user equipment within the second covered area, and
a second data store comprising authentication data of the one or more second user equipment within the second covered area,
wherein the second MCN communication system independently provides the second communication links between the one or more second user equipment without communication to another MCN communication system,
wherein the first MCN communication system and the second MCN communication system are each independently mobile with respect to each other and communicate with each other to provide third communication links between the one or more first user equipment and the one or more second user equipment, and
wherein the first MCN communication system is further configured to:
track location and movement of the second MCN communication system, and
determine whether handover operations are possible between the first and second MCN communication systems based at least in part on the tracked location and movement of the second MCN communication system with respect to the first MCN communication system.

2. A method for establishing a network of mobile cellular network (MCN) communication systems (NOM), the method comprising:
detecting a plurality of MCN communication systems for association based at least in part on at least one of location information of the plurality of MCN communication systems, responses to a broadcast query, or identification of users of the plurality of MCN communication systems, wherein each of the MCN communication systems is located within a covered area, is configured to generate an MCN for the respective covered area, and is independently mobile with respect to the other MCN communication systems, and wherein each MCN communication system comprises:
  a radio access component configured to receive wireless communications from one or more user equipment (UE) within the respective covered area,
  a control and data component in communication with the radio access component and configured to provide communication links between the one or more UE within the respective covered area, and
  a data store comprising authentication data of the one or more UE within the respective covered area,
wherein each of the MCN communication systems independently provides the communication links between the one or more UE without communication to another MCN communication system;
identifying a master device from among the plurality of MCN communication systems, wherein the data store of the master device further comprises:
  identification data of the plurality of MCN communication systems,
  location data of the plurality of MCN communication systems, and
  identification data of user equipment associated with the plurality of MCN communication systems;
generating NOM data based at least in part on UE data received from each of the plurality of MCN communication systems; and
providing the NOM data to each of the plurality of MCN communication systems.

3. The method of claim 2, wherein the master device is identified based at least in part on at least one of elevation of each of the plurality of MCN communication systems, a range of the MCNs corresponding to the plurality of MCN communication systems, a location of the plurality of MCN communication systems, or the users of the plurality of MCN communication systems.

4. The method of claim 2, wherein the NOM data comprises identification information of UE associated with each of the MCN communication systems, and location information of the plurality of MCN communication systems.

5. The method of claim 2, wherein the NOM data is provided to the plurality of MCN communication systems via at least one of satellite communication or microwave or radio wave communication from the master device.

6. A method for establishing a communication link between a first user equipment and a second user equipment, the method comprising:
  receiving at a first mobile cellular network (MCN) communication system a request from a first user equipment located within a first MCN corresponding to the first MCN communication system for a communication link with a second user equipment;
  determining at the first MCN communication system whether the second user equipment is located within the first MCN;
  upon determining that the second user equipment is located within the first MCN, establishing the communication link between the first user equipment and the second user equipment;
  upon determining that the second user equipment is not located within the first MCN, determining whether the second user equipment is located within a first network of MCN communication systems (NOM);
  upon determining that the second user equipment is located within the first NOM:
    retrieving communication link information from NOM data previously received from a master MCN communication system within the NOM, wherein the first MCN communication system and the master MCN communication system are each independently mobile with respect to each other and the master MCN communication comprises a data store comprising:
      identification data of the first MCN communication system,
      location data of the first MCN communication system, and
      identification data of user equipment associated with the first MCN communication system, and
    establishing the communication link between the first user equipment and the second user equipment; and
  upon determining that the second user equipment is not located within the first NOM:
    querying a second NOM,
    obtaining communication link information from the second NOM, and
    establishing the communication link between the first user equipment and the second user equipment.

7. The method of claim 6, wherein the NOM data comprises identification information of user equipment (UE) associated with each of the MCN communication systems, and location information of the MCN communication systems.

8. The method of claim 6, wherein the querying the second NOM comprises requesting the master MCN communication system to communicate with the second NOM.

9. The method of claim 6, wherein the obtaining communication link information comprises receiving the communication link information from the second NOM via the master MCN communication system.

10. A method for handing over user equipment (UE) between a moving mobile cellular network (MCN) communication system and an adjacent MCN communication system, the method comprising:
  detecting movement of a moving MCN communication system;
  determining a first time when handover operations will be unavailable between the moving MCN communication system and an adjacent MCN communication system, wherein the moving MCN communication system and the adjacent MCN communication system are independently mobile with respect to each other, and the adjacent MCN communication comprises a data store comprising:
    identification data of the moving MCN communication system,
    location data of the moving MCN communication system, and
    identification data of user equipment associated with the moving MCN communication system;
  identifying a first set of user equipment (UE) comprising UE associated with the moving MCN communication system;
  identifying a second set of UE comprising UE associated with the adjacent MCN communication system;
  identifying one or more UE within the first set of UE for handover to the adjacent MCN communication system due to the movement of the moving MCN communication system;

identifying one or more UE within the second set of UE for handover to the moving MCN communication system due to the movement of the moving MCN communication system and the movement of the identified one or more UE within the second set of UE;

handing over the identified one or more UE within the first set of UE to the adjacent MCN communication system prior to the first time; and handing over the identified one or more UE within the second set of UE to the moving MCN communication system prior to the first time.

11. The method of claim 10, wherein prior to the movement of the moving MCN communication system, the moving MCN communication system and the adjacent MCN communication system are adjacent to each other.

12. The method of claim 10, wherein the moving MCN communication system detects the movement and communicates the movement to the adjacent MCN communication system.

13. The method of claim 10, wherein a master MCN communication system detects the movement and communicates the movement to the adjacent MCN communication system.

14. The method of claim 10, wherein the first set of UE comprise UE within a moving MCN corresponding to the moving MCN communication system.

15. The method of claim 10, wherein the first set of UE comprise UE within an adjacent MCN corresponding to the adjacent MCN communication system.

16. The method of claim 10, wherein the one or more UE within the first set of UE are identified based at least in part on a radio signal strength between the one or more UE within the first set of UE and the moving MCN communication system and the radio signal strength between the one or more UE within the first set of UE and the adjacent MCN communication system.

17. The method of claim 10, wherein the one or more UE within the second set of UE are identified based at least in part on a radio signal strength between the one or more UE within the second set of UE and the moving MCN communication system and the radio signal strength between the one or more UE within the second set of UE and the adjacent MCN communication system.

18. The network of mobile cellular networks of claim 1, wherein during movement of the second MCN communication system, the second MCN communication system is further configured to detect a signal strength of at least one second user equipment of the one or more second user equipment and provide the at least one second user equipment with location information of another MCN communication system upon detecting a weak signal between the second MCN communication system and the at least one second user equipment.

19. The network of mobile cellular networks of claim 1, wherein the first MCN communication system independently provides the first communication links between the one or more first user equipment without communication to another MCN communication system when in a first operation mode, the second MCN communication system independently provides the second communication links between the one or more second user equipment without communication to another MCN communication system when in the first operation mode, and the first MCN communication system and the second MCN communication system communicate with each other to provide third communication links between the one or more first user equipment and the one or more second user equipment when in a second operation mode.

20. The method of claim 2, wherein each of the MCN communication system independently provides the communication links between the one or more UE without communication to another MCN communication system when in a first operation mode.

* * * * *